United States Patent [19]
Ford

[11] Patent Number: 5,969,300
[45] Date of Patent: Oct. 19, 1999

[54] WET MARINE EXHAUST MUFFLER

[75] Inventor: John R. Ford, Xenia, Ohio

[73] Assignee: Centek Industries, Inc.

[21] Appl. No.: 08/933,199

[22] Filed: Sep. 18, 1997

Related U.S. Application Data

[60] Provisional application No. 60/026,335, Sep. 19, 1996.

[51] Int. Cl.⁶ .............................. F01N 7/18; B32B 31/26
[52] U.S. Cl. .......................... 181/282; 181/235; 156/85
[58] Field of Search ..................... 181/235, 244, 181/246, 259, 260, 261, 282, 230; 440/89; 156/85, 86, 87; 264/230, 342 R

[56] References Cited

U.S. PATENT DOCUMENTS

| | | |
|---|---|---|
| 714,080 | 11/1902 | Whitson . |
| 1,938,849 | 12/1933 | Maxim et al. . |
| 2,142,268 | 1/1939 | Gibbs . |
| 2,241,010 | 5/1941 | Chipley . |
| 2,511,713 | 6/1950 | Hoyle et al. . |
| 2,721,619 | 10/1955 | Cheairs . |
| 3,296,997 | 1/1967 | Hoiby et al. . |
| 3,495,385 | 2/1970 | Glass . |
| 4,000,786 | 1/1977 | Ford . |
| 4,019,456 | 4/1977 | Harbert . |
| 4,589,852 | 5/1986 | Price . |
| 4,713,029 | 12/1987 | Ford . |
| 4,781,021 | 11/1988 | Winberg . |
| 4,821,840 | 4/1989 | Harwood et al. . |
| 4,909,348 | 3/1990 | Harwood et al. . |
| 4,917,640 | 4/1990 | Miles . |
| 5,022,877 | 6/1991 | Harbert . |
| 5,046,977 | 9/1991 | Rodskier . |
| 5,096,446 | 3/1992 | Tazaki et al. . |
| 5,147,232 | 9/1992 | Miles et al. . |
| 5,196,655 | 3/1993 | Woods . |
| 5,244,521 | 9/1993 | Ligman ................................. 156/85 |
| 5,259,797 | 11/1993 | Miles et al. . |
| 5,284,451 | 2/1994 | Chiu . |
| 5,588,888 | 12/1996 | Magharious . |

*Primary Examiner*—Khanh Dang
*Attorney, Agent, or Firm*—Biebel & French

[57] ABSTRACT

A wet marine exhaust muffler includes a metallic housing and a polymeric jacket substantially encapsulating the metallic housing. The metallic housing defines one or more chambers in the interior of the housing. An inlet pipe and an outlet pipe each extend through openings in the polymeric jacket and communicate with at least one chamber in the interior of the housing. The metallic housing is preferably formed from stainless steel and the polymeric jacket is preferably formed from a thermoplastic material having a thickness of approximately 0.001 inch to 0.1 inch, and more preferably of approximately 0.005 inch to 0.060 inch. According to one preferred method for inhibiting the explosion of a wet marine exhaust muffler, the muffler housing (but not the inlet and outlet pipes) is at least partially surrounded by a heat shrinkable thermoplastic tubing and the heat shrinkable thermoplastic tubing is heated by conventional means to shrink the heat shrinkable thermoplastic tubing over the muffler housing to form the thermoplastic jacket. It is one object of the invention to provide a wet marine exhaust muffler, and a method for manufacturing such a muffler, effective to prevent or minimize explosion damage without substantially increasing the manufacturing cost or compromising other desirable muffler characteristics.

11 Claims, 3 Drawing Sheets

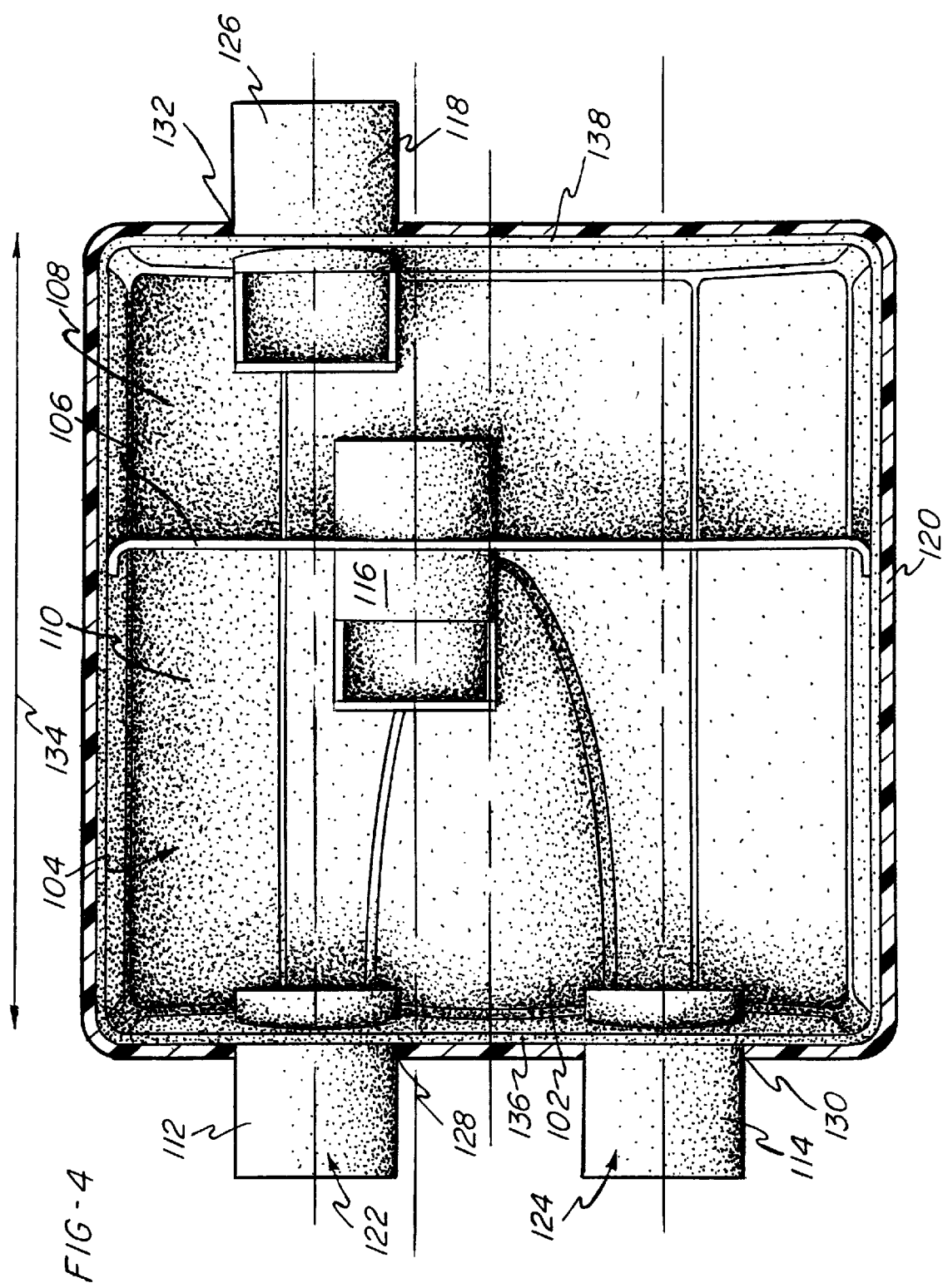

WET MARINE EXHAUST MUFFLER

CROSS-REFERENCE TO RELATED APPLICATIONS

This application claims the benefit of U.S. patent application Ser. No. 60/026,335, filed Sep. 19, 1996.

BACKGROUND OF THE INVENTION

1. Field Of The Invention

The present invention pertains to exhaust mufflers for watercraft, and more particularly to a method and apparatus for preventing or minimizing explosion damage by wet marine exhaust mufflers. A preferred embodiment of the invention comprises a muffler having a metallic housing encapsulated in a polymeric jacket to promote the integrity of the muffler when subjected to high internal pressure surges.

2. Description Of The Related Art

Motorized watercraft typically have included exhaust mufflers for muffling or attenuating exhaust noise generated by the operation of marine engines. Such mufflers have had to be capable of handling not only exhaust gas itself, but also droplets of water injected into the exhaust flow from the cooling system of the engine. The water injected from the engine cooling system typically performed two functions, namely, absorbing engine exhaust noise and cooling the exhaust gas so that the gas might be safely discharged through the hull of the craft without presenting a fire hazard.

Mufflers of various designs have been placed in the exhaust conduits running between the engines and the discharges. Typically, marine mufflers include housings which enclose one or more chambers for permitting expansion of the exhaust gas to attenuate noise. One example of a wet marine exhaust muffler is disclosed in U.S. Pat. No. 5,588,888 to Magharious, the disclosure of which is incorporated herein by reference. Often, marine muffler designs have been closely akin to the mufflers used on automobiles but have been constructed of fiber reinforced polymer materials such as FIBERGLASS materials which can better tolerate the marine environment.

Drawbacks to the use of fiber reinforced polymer materials as opposed to metals in the fabrication of exhaust mufflers have included lower strength and greater elasticity in comparison to metals. For example, acoustical energy in the exhaust gas passing through the muffler could induce sympathetic elastic vibrations in the walls of the housing. Such vibrations reduce the ability of the muffler to attenuate acoustical noise and may also contribute to possible failure of the housing walls.

Under certain circumstances, wet marine exhaust mufflers have been exposed to abnormally high internal pressure surges (that is, "backfires") sufficient to cause the mufflers to explode. Such explosions are capable of causing damage to the craft in which the mufflers were installed as well as injury to persons positioned in or near the craft.

Past efforts to prevent or reduce explosion damage have included changes in the configurations (e.g., geometries, chamber sizes, pipe positions and the like) of the mufflers and in the materials from which the mufflers were made. Such changes significantly increase the costs of manufacturing the mufflers. The changes also require compromises in other desirable characteristics of the mufflers, such as corrosion resistance and accoustical characteristics.

Consequently, there remains a need for a wet marine exhaust muffler, and for a method for manufacturing such a muffler, effective to prevent or minimize explosion damage without substantially increasing the manufacturing cost or compromising other desirable muffler characteristics.

SUMMARY OF THE INVENTION

This need is addressed by means of the wet marine exhaust muffler of the present invention. The preferred wet marine exhaust muffler of the present invention includes a metallic housing and a continuous, unbroken polymeric jacket or surface layer substantially encapsulating the metallic housing. The metallic housing defines one or more chambers in the interior of the housing. Though the structure by which exhaust gas is admitted and discharged from the one or more chambers in the interior of the housing is not critical to the invention, the muffler preferably includes an inlet pipe and an outlet pipe. The inlet and outlet pipes each extend through openings in the polymeric jacket aligned with the inlet and outlet, respectively, and communicate with at least one chamber in the interior of the housing. Preferably, the exterior surfaces of end portions of the inlet and outlet pipes are left bare of polymer material to facilitate coupling with other components in the marine wet exhaust system.

The preferred muffler structure substantially improves the ability of a muffler having a conventional configuration and formed from conventional materials to withstand high internal pressure surges (that is, "backfires") without rupturing. Even though the wall thickness of the polymeric jacket is preferably small compared to the wall thickness of the muffler housing which it encapsulates, the jacket will withstand internal pressure surges up to 5 kpsi or more prior to bursting. Furthermore, due to the elasticity of the polymer material, the jacket will stretch slightly in response to an internal pressure surge. This capacity to stretch enables the jacket to retain its integrity and to contain the remains of the muffler structure even if the muffler structure fractures due to the pressure surge.

The configuration of the muffler is not critical to the present invention. Conventional muffler configurations useful in connection with the present invention include that disclosed in U.S. Pat. No. 5,588,888 to Magharious. In an especially preferred embodiment, the muffler housing is formed from stainless steel to provide added strength along the exterior of the muffler.

The polymeric jacket is preferably made from a conventional thermoplastic material. Preferred thermoplastic materials include polyester, polyamide, polyolefin and polycarbonate materials. The criteria for selecting the thermoplastic material include sufficient resistance to combustion and to softening due to heat, petroleum-based lubricants, solvents and the like to remain durable in a marine propulsion system environment. In an especially preferred form, the polymeric jacket is formed from a heat shrinkable material, such as heat shrinkable polymer materials available from Advanced Polymers, Inc. of Salem, Mass.; Electro-Insulation Corp. of Arlington Heights, Ill. and Cary Industries of Maryland Heights, Mo. The thickness of the polymer jacket is preferably on the order of 0.001 inch to 0.1 inch, and even more preferably on the order of 0.005 inch to 0.060 inch.

The process by which the polymeric jacket is formed on the metallic housing is not critical to the invention in its broadest sense, but certain methods are preferred due to their low manufacturing costs. According to one preferred method, the muffler housing is at least partially surrounded by a heat shrinkable thermoplastic tubing and the heat shrinkable thermoplastic tubing is heated by conventional means, such as by a heat gun. The heating shrinks the heat shrinkable thermoplastic tubing over the muffler housing to form a thermoplastic jacket encapsulating the muffler housing. In an especially preferred form in which the muffler includes inlet and outlet pipes, the heat shrinkable thermoplastic tubing is positioned so as to substantially surround the metallic housing but not the inlet and outlet pipes so as to leave end portions of the inlet and outlet pipes bare of polymer material.

Alternative preferred methods for forming the polymeric jacket include exposing the muffler housing to a liquid polymer precursor and solidifying the polymer precursor to form the polymeric jacket. The polymer precursor may be prepared by any conventional means and its precise morphology is not critical to the invention. Likewise, the technique by which the muffler housing is exposed to the polymer precursor is not critical, though preferred techniques include painting the polymer precursor on the muffler housing and dipping the muffler housing in the precursor.

Therefore, it is one object of the present invention to provide a wet marine exhaust muffler, and a method for manufacturing such a muffler, designed so as to prevent or minimize explosion damage without substantially increasing the manufacturing cost or compromising other desirable muffler characteristics. The invention will be further described in conjunction with the appended drawings and following detailed description.

BRIEF DESCRIPTION OF THE DRAWINGS

FIG. 4 is a cut-away view of the embodiment of FIG. 3, taken along the lines 4—4 in FIG. 3.

DETAILED DESCRIPTION OF THE PREFERRED EMBODIMENT

Figure 1:
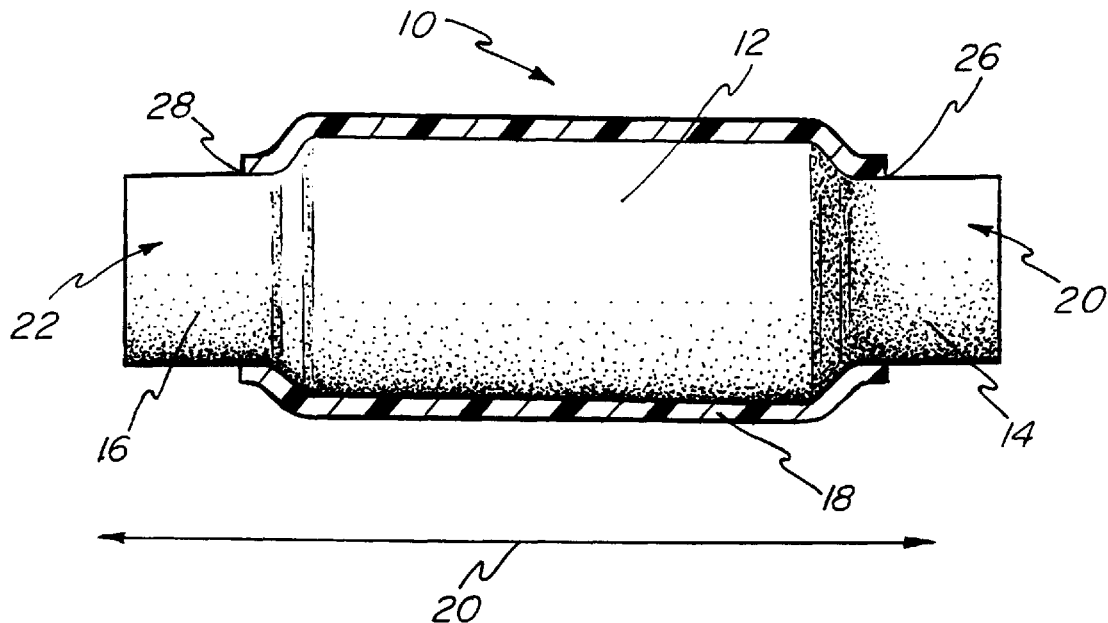
FIG. 1 is a schematic view of a first embodiment of a wet marine exhaust muffler according to the invention with its polymeric jacket partially cut away to reveal an exterior surface of a housing of the muffler.

Referring initially to FIG. 1 of the drawings, a first embodiment 10 of a wet marine muffler comprises a substantially cylindrical metallic housing 12, preferably formed of stainless steel or other durable metal and defining one or more chambers (not shown) in the interior of the housing 12; an inlet pipe 14 and an outlet pipe 16, each communicating with a chamber of the one or more chambers in the interior of the housing 12; and a polymeric jacket 18 (shown in section) substantially encapsulating the housing 12. The polymeric jacket 18 is preferably made from a conventional thermoplastic material. Preferred polymer materials include polyester, polyolefin and polycarbonate materials. In an especially preferred form, the polymeric jacket 18 is formed from a heat shrinkable material.

One preferred method for inhibiting the explosion of the muffler 10 comprises the steps of at positioning a heat shrinkable thermoplastic tubing (not shown) over the muffler housing 12 and heating the heat shrinkable thermoplastic tubing by conventional means, such as by a heat gun. The heating shrinks the heat shrinkable thermoplastic tubing over the muffler housing 12 to form the polymeric jacket encapsulating the muffler housing. The heat shrinkable thermoplastic tubing may be, for example, in the form either of a continuous sleeve or of a sheet or film rolled over to form a tube. Preferably the heat shrinkable plastic tubing has a diameter sufficiently large for the tubing to fit easily over the housing 12 and a thickness sufficient such that the finished polymeric jacket is approximately 0.001 inch to 0.1 inch, and even more preferably approximately 0.005 inch to 0.060 inch, thick. Optionally, the finished polymeric jacket 18 is cured to improve its mechanical and chemical properties.

It is preferable that the heat shrinkable thermoplastic tubing have an axial length substantially corresponding to the length of the finished polymeric jacket. In this manner, the heat shrinkable thermoplastic tubing surrounds the housing 12 but not end portions 20 and 22 of the inlet and outlet pipes 14, 16 so that the inlet and outlet pipes 14, 16 extend through openings 26 and 28 in the finished polymeric jacket 18.

Other preferred methods for inhibiting the explosion of the muffler 10 include exposing the housing 12 to a liquid polymer precursor (not shown), either by painting the polymer precursor onto the exterior surface of the housing 12 or dipping the housing 12 into the polymer precursor, and solidifying the polymer precursor to form the polymeric jacket 18. The end portions 20, 22 of the inlet and outlet pipes 14, 16 may be masked by conventional means during the exposure to the polymer precursor. Optionally, the finished polymeric jacket 18 is cured by conventional means to improve its mechanical and chemical properties. Conversion of the polymer precursor to desired polymer may be achieved by conventional techniques including irradiation of an ethylenially unsaturated monomer, for example, to form the desired polymer through free radical (chain addition) techniques. Additionally, thermoplastic polymers can be formed as the encapsulating medium from appropriate monomers by step-reaction (condensation) or ionic and coordination chain polymerization techniques.

Figure 2:
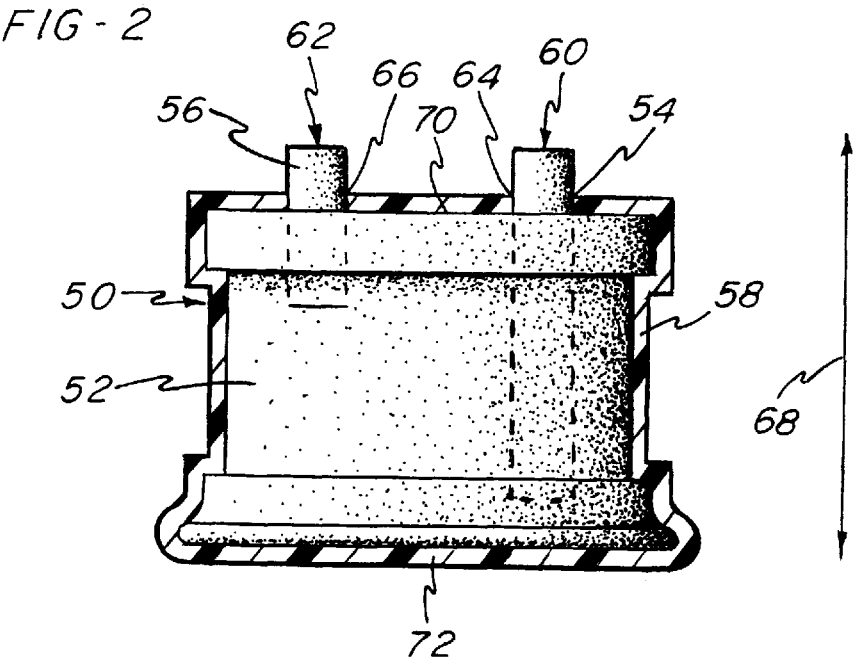
FIG. 2 is a schematic view of a second embodiment of a wet marine exhaust muffler according to the invention with its polymeric jacket partially cut away to reveal an exterior surface of a housing of the muffler and with internal structure shown in phantom.

FIG. 2 shows a second embodiment 50 of a wet marine exhaust muffler comprising a housing 52, preferably formed of stainless steel or other durable metal and defining a chamber (not shown) in an interior (not shown) of the housing 52; an inlet pipe 54 (shown partially in phantom) and an outlet pipe 56 (shown partially in phantom), each communicating with the chamber in the interior of the housing 52; and a polymeric jacket 58 (shown in section) substantially encapsulating the housing 52. As was true of the polymeric jacket 18 of FIG. 1, the polymeric jacket 58 is preferably made from a conventional thermoplastic material. In an especially preferred form, the polymeric jacket 58 is formed from a heat shrinkable material. The thickness of the polymeric jacket 58 is preferably on the order of 0.001 inch to 0.1 inch, and even more preferably on the order of 0.005 inch to 0.060 inch.

The polymeric jacket 58 is preferably formed by heat shrinking a heat shrinkable thermoplastic tubing (not shown) over the housing 52 or by exposing the housing 52 to a liquid polymer precursor by techniques similar to the preferred techniques used in forming the polymeric jacket 18 of FIG. 1. End portions 60 and 62 of the inlet and outlet pipes 54, 56 extend through openings 64 and 66 in the polymeric jacket 58. In forming the polymeric jacket 58 by heat shrinking a heat shrinkable thermoplastic tubing over the housing 52, a tubing having an axial length greater than the height 68 of the housing 52 should be used so as to facilitate coverage of opposite sides 70 and 72 of the housing 52.

Figure 3:
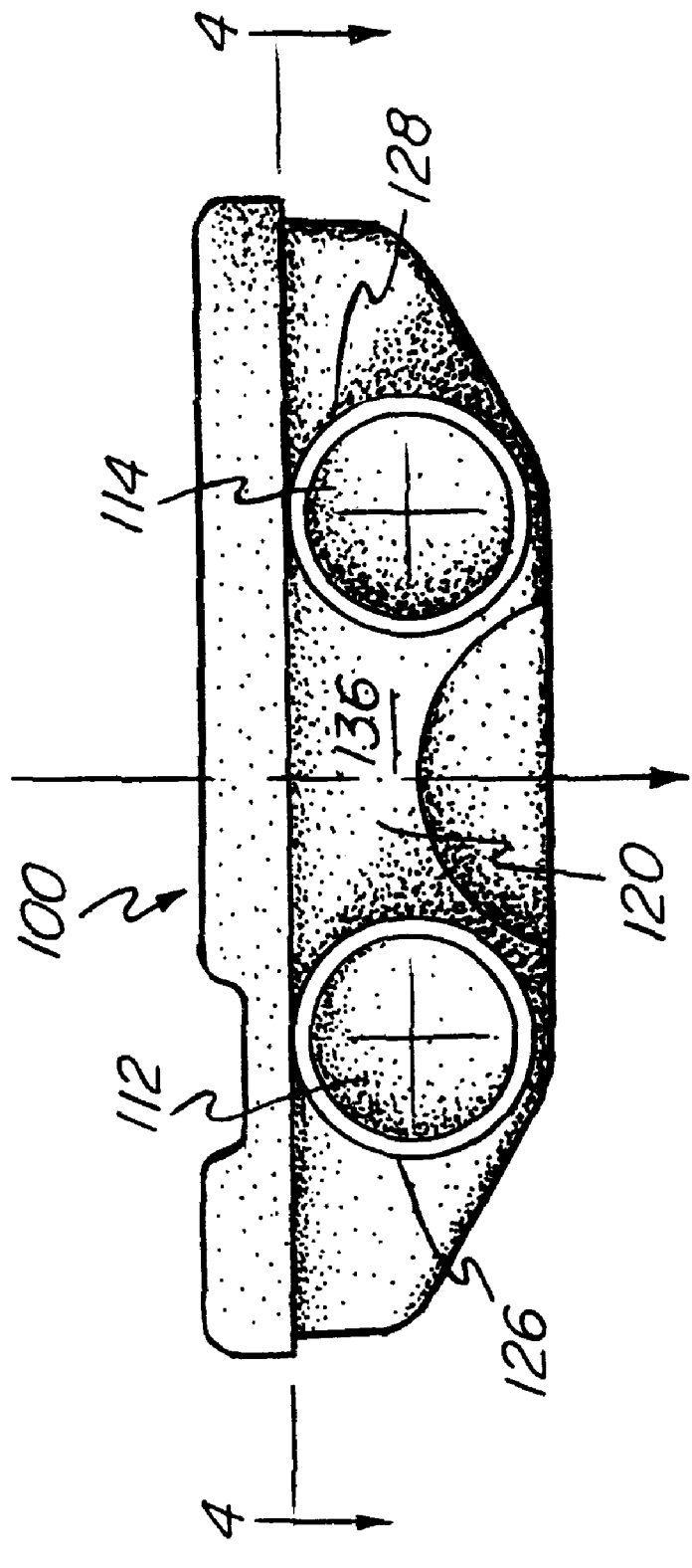
FIG. 3 is an elevational view of a third embodiment of a wet marine exhaust muffler according to the invention.

FIGS. 3 and 4 show a third embodiment 100 of a wet marine exhaust muffler. As best shown in FIG. 4, the muffler 100 comprises a housing 102, preferably formed of stainless steel or other durable metal and defining an interior 104; an internal baffle 106 cooperating with the housing 102 to define a first chamber 108 and a second chamber 110 in the interior 104; a pair of inlet pipes 112 and 114 communicating with the first chamber 108; a baffle pipe 116 communicating between the first and second chambers 108, 110; an outlet pipe 118 communicating with the second chamber 110; and a polymeric jacket 120 substantially encapsulating the housing 102. The configuration and operation of the muffler 100 is discussed in more detail in U.S. Pat. No. 5,588,888 to Magharious, the disclosure of which is incorporated herein by reference.

The polymeric jacket 120 is preferably made from a conventional thermoplastic material. In an especially preferred form, the polymeric jacket 120 is formed from a heat shrinkable material. The thickness of the polymeric jacket 120 is preferably on the order of 0.001 inch to 0.1 inch, and even more preferably on the order of 0.005 inch to 0.060 inch.

The polymeric jacket 120 is preferably formed by heat shrinking a heat shrinkable thermoplastic tubing (not shown) over the housing 102 or by exposing the housing 102 to a liquid polymer precursor by techniques similar to the preferred techniques used in forming the polymeric jacket 18 in the embodiment 10 of FIG. 1 and the polymeric jacket 58 of the embodiment 50 of FIG. 2. End portions 122, 124 and 126 of the inlet and outlet pipes 112, 114, 118 extend through openings 126, 130 and 132 in the polymeric jacket 120. In forming the polymeric jacket 120 by heat shrinking a heat shrinkable thermoplastic tubing over the housing 102, a tubing having an axial length greater than the length 134 of the housing 102 should be used so as to facilitate coverage of opposite sides 136 and 138 of the housing 102.

The present invention substantially improves the ability of the muffler 10, 50, 100 to withstand high internal pressure surges (that is, "backfires"). Even though the wall thicknesses of the polymeric jackets 18, 58, 120 are preferably small compared to wall thicknesses of the housings 12, 52, 102, the polymeric jackets 18, 58, 120 will withstand internal pressure surges up to 5 kpsi or more prior to bursting. Furthermore, due to the elasticity of the polymer material, the jackets 18, 58, 120 will stretch slightly at the moment of explosion. This capacity to stretch enables the jackets 18, 58, 120 to retain their integrity and to contain the remains of the housings 12, 52, 102 even if the housings 12, 52, 102 fracture due to the explosions.

At the same time, it is noted that the configurations of the mufflers 10, 50, 100 and, in particular, the geometries of the housings 12, 52, 102, are all conventional. No modifications to the configurations are required in order to carry out the present invention and properties such as acoustical properties (e.g., "tuning") are not compromised. Likewise, conventional materials such as stainless steel can be, and preferably are, used to construct the housings 12, 52, 112 and the internal structures (e.g., the internal baffle 106 and the pipes 102, 114, 118 of the muffler 100). The use of conventional materials and configurations, as well as of low cost techniques for forming the polymeric jackets 18, 58, 120, helps to minimize manufacturing costs.

Having described the invention in detail and by reference to preferred embodiments thereof, it will be apparent that modifications and variations are possible without departing from the scope of the appended claims.

What is claimed is:

1. A method for inhibiting the explosion of a watercraft muffler having a metallic housing defining at least one chamber, the method comprising the steps of:
   a) positioning a heat shrinkable thermoplastic material over the housing; and
   b) heating the heat shrinkable thermoplastic material to form a polymeric jacket substantially encapsulating the metallic housing, wherein the heat shrinkable plastic material has a thickness sufficient to form a polymeric jacket approximately 0.005 inch to 0.1 inch thick.

2. The method as recited in claim 1 wherein the heat shrinkable plastic material has a thickness sufficient to form a polymeric jacket approximately 0.005 inch to 0.060 inch thick.

3. A watercraft muffler having a polymeric jacket formed according to the method recited in claim 1.

4. A method for inhibiting the explosion of a watercraft muffler having a metallic housing defining at least one chamber, the method comprising the steps of:
   a) positioning a heat shrinkable thermoplastic material over the housing; and
   b) heating the heat shrinkable thermoplastic material to form a polymeric jacket substantially encapsulating the metallic housing, wherein the watercraft muffler includes an inlet pipe and an outlet pipe, the inlet and outlet pipes communicating with the at least one chamber and projecting from an outer surface of the metallic housing; and wherein the step a) includes positioning the heat shrinkable plastic material over the metallic housing such that the inlet and outlet pipes extend outside the heat shrinkable plastic tubing.

5. A method for inhibiting the explosion of a watercraft muffler having a metallic housing defining at least one chamber, the method comprising the steps of:
   a) exposing the metallic housing to a thermoplastic polymer precursor; and b) solidifying the thermoplastic polymer precursor to form a polymeric jacket substantially encapsulating the metallic housing.

6. The method as recited in claim 5 wherein the step a) includes forming a layer of the polymer precursor sufficiently thick to solidify to form a polymeric jacket having a thickness of approximately 0.001 inch to 0.1 inch.

7. The method as recited in claim 5 wherein the step a) includes forming a layer of the polymer precursor sufficiently thick to solidify to form a polymeric jacket having a thickness of approximately 0.005 inch to 0.060 inch.

8. The method as recited in claim 5 including the additional step of:

c) curing the polymeric jacket.

9. A watercraft muffler having a polymeric jacket formed according to the method recited in claim 5.

10. A method for inhibiting the explosion of a watercraft muffler having a housing defining at least one chamber, the method comprising the steps of:

a) positioning a heat shrinkable thermoplastic material over the housing; and b) heating the heat shrinkable thermoplastic material to form a polymeric jacket substantially encapsulating the housing, wherein the heat shrinkable plastic material has a thickness sufficient to form a polymeric jacket approximately 0.005 inch to 0.1 inch thick.

11. A method for inhibiting the explosion of a watercraft muffler having a housing defining at least one chamber, the method comprising the steps of:

a) positioning a heat shrinkable thermoplastic material over the housing; and b) heating the heat shrinkable material to form a polymeric jacket substantially encapsulating the housing, wherein the watercraft muffler includes an inlet pipe and an outlet pipe, the inlet and outlet pipes communicating with the at least one chamber and projecting from an outer surface of the housing; and wherein the step a) includes positioning the heat shrinkable plastic material over the housing such that the inlet and outlet pipes extend outside the heat shrinkable plastic tubing.

* * * * *